June 9, 1953     A. SECOFSKY ET AL     2,641,430
ADJUSTABLE CAMERA AND SPOTLIGHT SUPPORT
Filed June 11, 1951
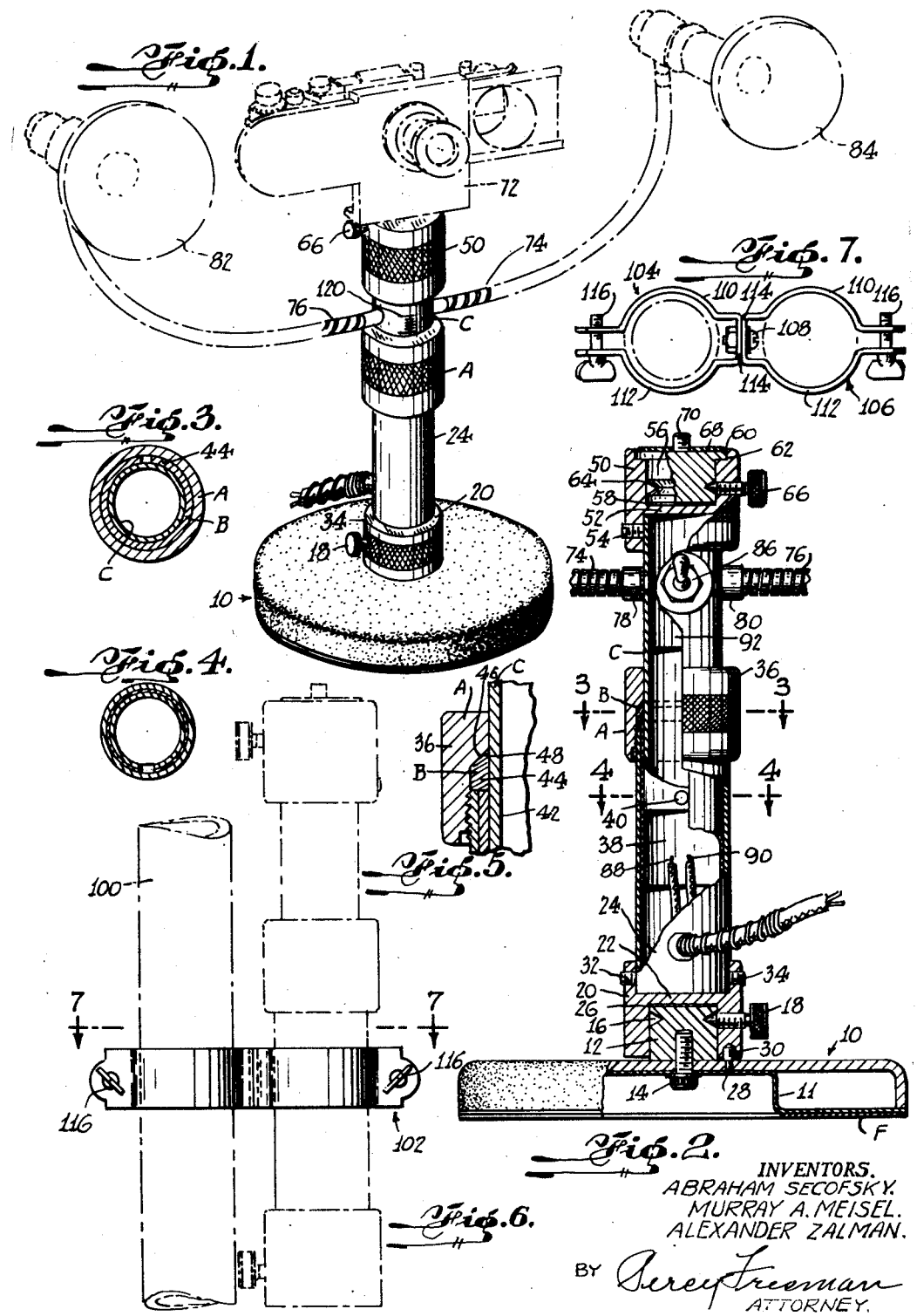
INVENTORS.
ABRAHAM SECOFSKY.
MURRAY A. MEISEL.
ALEXANDER ZALMAN.
BY Percy Freeman
ATTORNEY.

Patented June 9, 1953

2,641,430

UNITED STATES PATENT OFFICE 2,641,430

ADJUSTABLE CAMERA AND SPOTLIGHT SUPPORT

Abraham Secofsky and Murray A. Meisel, Brooklyn, and Alexander Zalman, Kew Gardens Hills, N. Y.

Application June 11, 1951, Serial No. 230,882

1 Claim. (Cl. 248—161)

This invention relates to an adjustable stand for cameras and spot lights.

The principal object of this invention is the provision of an adjustable stand of the character described wherein the spot lights are movable with the camera to automatically illuminate the object upon which the camera is focused. The camera and spot lights are mounted on a common support and said support is adjustable in position so as to change the focus and lighting arrangement relative to the object being photographed without changing the focus of the camera relative to the focus of the spot lights. All that the photographer need do, therefore, is to concentrate upon a proper focus of the camera. This will automatically have the effect of properly focusing the spot lights. In short, the adjustable stand herein described and claimed provides for automatic illumination of whatever the camera sees.

Another object of the present invention is the provision of an adjustable stand of the character described wherein adjusting means are provided for adjusting the position of the camera relative to the stand, relative to the object being photographed, and relative to the spot lights. The camera is mounted on a swivel which in turn is mounted on the stand proper. When the swivel is locked, the camera and the spot lights move integrally with each other. When the swivel is unlocked, the camera is enabled to turn relative to the spot lights. In some applications, it is desirable to have the camera and spot lights move together but in other applications it is desirable that the camera be free to move without changing the positions of the spot lights.

A preferred form of this invention is shown in the accompanying drawing, in which:

Fig. 1 is a perspective view of an adjustable stand made in accordance with this invention.

Fig. 2 is a vertical section therethrough showing all of the component parts thereof.

Fig. 3 is a horizontal section therethrough on the line 3—3 of Fig. 2.

Fig. 4 is a horizontal section on the line 4—4 of Fig. 2.

Fig. 5 is a fragmentary, vertical section through the locking means which controls the vertical adjustment of the stand, and drawn to an enlarged scale.

Fig. 6 shows how the adjustable stand herein claimed may be mounted upon a vertical post.

Fig. 7 is a sectional view taken on the line 7—7 of Fig. 6.

The adjustable stand constituting the present invention includes a base 10 which may be set upon a table or other horizontal surface. The base shown in the drawing is disc-shaped, and it may be stamped or cast out of suitable material such as aluminum or zinc alloy. Other materials may, of course, be used for this purpose and the base may be designed in any other suitable shape. A bottom disc 11 of thin sheet material may be added to support a felt pad F and to present a finished appearance to the bottom of the stand. Mounted on top of the base, centrally thereof, is a cylindrical block 12 which is secured to said base by means of a screw 14. An annular groove 16 is formed in the side of said cylindrical block to accommodate a set screw 18 mounted in a sleeve 20. Sleeve 20 is open at the top and bottom and it is divided into two compartments by means of a horizontal wall or partition 22. The lower compartment accommodates cylindrical block 12 and the upper compartment accommodates a fixed cylindrical casing 24. A cork pad 26 serves as a gasket or washer between the horizontal wall 22 of sleeve 20 and the top of cylindrical block 12.

It wil be noted that annular groove 16 is V-shaped in cross-section and it will also be noted that set screw 18 is provided with a cone-shaped point for engagement with said V-shaped groove. This relationship enables the set screw to cam its way into the groove and to lock sleeve 20 tightly upon cylindrical block 12. Provision is made for always positioning said sleeve 20 in the same position relative to base 10. A pin or screw 28 is fixed in the base and a hole 30 is provided in the sleeve to receive said pin or screw. Hence the sleeve may be removed from the cylindrical block and then replaced thereon but its position relative to the base will always be the same. Set screw 18 has a knurled head so that it may be operated manually as a thumb screw to quickly engage or disengage sleeve 20 relative to cylindrical block 12.

Cylindrical casing 24 is fixed in place in the upper compartment of sleeve 20 by means of set screws 32 and 34. More precisely, the lower end of said cylindrical casing rests upon the horizontal wall or partition formed in sleeve 20. The top end of cylindrical casing 24 is threaded to receive a knurled locking nut or clutch 36 for a purpose which will shortly be explained. Fixed in cylindrical casing 24 is a split sleeve 38. The split in said sleeve extends vertically thereof its full length and its serves as a key-way for a key 40 in slidable sleeve 42. Slidable sleeve 42 is mounted for slidable movement within the split sleeve, such movement taking place only vertically in either direction within limits, because the inter-engagement between key 40 and the split sleeve prevents the slidable sleeve from turning relative to said split sleeve and also, by the same token, relative to cylindrical casing 24 in which said split sleeve is fixed. Likewise, the sleeve 42 cannot be pulled out of split sleeve 38 because its key 40 will meet split ring 44 which is mounted within the knurled nut 36 and upon the top edges of cylindrical casing 24 and split sleeve 38. It will be seen that knurled nut 36 has a tapered shoulder 46 formed therein and that the split ring 44 has a complementarily tapered top edge 48. Tapered shoulder 46 is an annular shoulder which engages the entire tapered edge of the split ring. When the knurled nut is tightened upon cylindrical casing 24, its tapered shoulder presses downwardly and radially inwardly upon the split ring causing the ring to contract and to grip the slidable sleeve 42. This produces a locking effect upon the slidable sleeve and fixes it in position relative to the cylindrical casing. In other words, knurled nut 36 is a locking nut which locks the slidable sleeve in place by pressing the split clutch ring against it. When the knurled nut is loosened upon the cylindrical casing, the slidable sleeve may be pulled upwardly or pushed downwardly to any desired location, and it may then be locked in place in said location by simply tightening the knurled nut upon the cylindrical casing.

A top sleeve 50 is mounted upon the top of the slidable sleeve 42. Top sleeve 50 resembles bottom sleeve 20 in many aspects, including the fact that it possesses a horizontal wall or partition 52 which separates it into an upper and a lower compartment. The top end of the slidable sleeve 42 projects into the lower compartment of top sleeve 50 and a set screw 54 in said top sleeve secures said top sleeve to the slidable sleeve. A cylindrical block 56 is mounted in the top compartment of top sleeve 50. Cylindrical block 56 bears some similarity to cylindrical block 12 and for the purpose of readily distinguishing them, cylindrical block 56 will be designated as the top cylindrical block and cylindrical block 12 will be designated as the bottom cylindrical block. A pad 58, made of cork or other suitable material, is interposed between top cylindrical block 56 and horizontal wall 52 of the top sleeve 50. Cylindrical block 56 has an annular flange 60 formed thereon, radially outwardly therefrom along its top peripheral edge. This annular flange fits into a recess 62 formed in top sleeve 50. An annular groove 64 is formed in cylindrical block 56 and a set screw 66 in top sleeve 50 engages said annular groove. The groove is V-shaped in cross-section and the set screw has a cone-shaped point for camming and locking engagement with said groove. On top of cylindrical block 56 is another cork pad 68 and a threaded stud 70 projects upwardly from said cylindrical block, centrally thereof, through a hole in said cork pad. A camera 72 may be mounted on said cork pad 68 and held in place by reason of a screw threaded engagement with stud 70. This would constitute a conventional means for mounting the camera.

Flexible arms 74 and 76 are fastened by means of ferrules 78 and 80 to opposite sides of slidable sleeve 42. These two arms support the spot lights 82 and 84 in the manner shown in Fig. 1 and in Fig. 2. Conventional electrical conductors extend through arms 74 and 76 and they are connected at one end to the spot lights and at the other end to a switch 86. This switch is connected by means of conductors 88 and 90 to a suitable source of electric current. The switch is mounted in an opening formed adjacent the top of the slidable sleeve and an insulating pad or sleeve 92 is provided in said slidable sleeve in the vicinity of said switch and of spot light supporting arms 74 and 76. This is a precautionary measure taken to prevent short circuits.

In Fig. 1, the adjustable stand is shown to include base 10. This base may be placed upon a table for close work. It may be found desirable, however, for certain photographic purposes, to remove the base for mounting the stand on a tripod or for holding it in the hand, or to place the adjustable stand on a post 100 which stands upon the floor or is supported in any other suitable way. The adjustable stand herein described and claimed may be secured to the post by means of clamp 102, but first base 10 should be detached from the adjustable stand. This is shown in Figs. 6 and 7. Clamp 102 is, in effect, a pair of clamps 104 and 106 pivotally connected to each other by means of bolt 108. When the bolt is screwed tight, the two clamp members 104 and 106 are locked against pivotal movement of either relative to the other. When the bolt is relatively loose on said clamp members, they may be made to pivot relative to each other. It will be noted in Fig. 7 that the two clamp members 104 and 106 are identical with each other and each comprises a pair of curved arms 110 and 112 which are integral with each other at one end, being joined by means of a yoke 114. The two clamp members 104 and 106 are joined with each other by means of bolt 108 aforementioned which extends through their respective yokes and holds their said yokes flat against each other. The opposite or free ends of the two curved arms 110 and 112 are inter-engaged by means of a thumb screw 116. The curved arms of the clamp member 104 are adapted to embrace post 100 and the thumb screw on said curved arms clamps them to said post. The curved arms of clamp member 106 are adapted to embrace cylindrical casing 24 of the adjustable stand and the thumb screw 116 in said clamp member enables it to be clamped tight upon said cylindrical casing.

The foregoing is descriptive of a preferred form of this invention, and this preferred form may be modified in many ways and applied in many ways within the broad scope and coverage of the invention. The adjustable stand which constitutes this invention may be calibrated for ready adjustment of the camera support to any desired position. Illustrative are calibrations 120 on slidable sleeve 42.

Having thus described our invention, what we claim as new and desire to secure by Letters Patent, is:

An adjustable standard of the character described comprising a base, a cylindrical casing removably and adjustably fixed to said base, a split sleeve fixed to the inside of said cylindrical casing, the split in said sleeve extending longitudinally thereof and constituting a key-way, a second sleeve slidably mounted in the split sleeve, a key on said second sleeve which rides in said key-way and prevents relative angular movement between said second sleeve and said cylindrical casing, a lock on said cylindrical casing mounted for engagement with said second sleeve to lock said second sleeve in any desired axial position relative to said cylindrical casing, said lock comprising a split ring which rests on top of the cylindrical casing and encircles said second sleeve and a locking nut which encircles the split ring and which is in screw-threaded engagement with the cylindrical casing, said locking nut having a tapered annular internal shoulder and said split ring having a complementarily tapered edge which is in engagement with said tapered shoulder of the locking nut whereby the split ring is compressed against said second sleeve by said locking nut to frictionally lock said second sleeve in place when said locking nut is turned in one direction and whereby the split ring is released from engagement with said second sleeve when the locking nut is turned in the opposite direction.

ABRAHAM SECOFSKY.
    MURRAY A. MEISEL.
    ALEXANDER ZALMAN.

References Cited in the file of this patent

UNITED STATES PATENTS

| Number | Name | Date |
|---|---|---|
| 678,642 | Chambers | July 16, 1901 |
| 951,606 | Hanstein | Mar. 8, 1910 |
| 1,696,530 | Duncan | Dec. 25, 1928 |
| 2,418,067 | Carpenter | Mar. 25, 1947 |

FOREIGN PATENTS

| Number | Country | Date |
|---|---|---|
| 663,581 | Great Britain | June 18, 1948 |